(12) United States Patent
Wei et al.

(10) Patent No.: US 9,140,186 B2
(45) Date of Patent: Sep. 22, 2015

(54) SWEEP-BASED MEMBRANE GAS SEPARATION INTEGRATED WITH GAS-FIRED POWER PRODUCTION AND CO2 RECOVERY

(71) Applicants: Xiaotong Wei, Mountain View, CA (US); Richard W Baker, Palo Alto, CA (US); Timothy C Merkel, Menlo Park, CA (US); Brice C. Freeman, Menlo Park, CA (US)

(72) Inventors: Xiaotong Wei, Mountain View, CA (US); Richard W Baker, Palo Alto, CA (US); Timothy C Merkel, Menlo Park, CA (US); Brice C. Freeman, Menlo Park, CA (US)

(73) Assignee: Membrane Technology and Research, Inc, Newark, CA (US)

(*) Notice: Subject to any disclaimer, the term of this patent is extended or adjusted under 35 U.S.C. 154(b) by 204 days.

(21) Appl. No.: 13/830,530

(22) Filed: Mar. 14, 2013

(65) Prior Publication Data
US 2013/0200625 A1    Aug. 8, 2013

Related U.S. Application Data

(63) Continuation-in-part of application No. 13/665,620, filed on Oct. 31, 2012, now Pat. No. 9,005,335, which
(Continued)

(51) Int. Cl.
*B01D 53/22* (2006.01)
*F02C 7/00* (2006.01)
(Continued)

(52) U.S. Cl.
CPC . *F02C 7/00* (2013.01); *B01D 53/22* (2013.01); *B01D 53/62* (2013.01); *F02C 3/34* (2013.01); *F23C 9/00* (2013.01); *F23J 15/02* (2013.01); *F23L 7/007* (2013.01); *H02K 7/1823* (2013.01); *B01D 53/1475* (2013.01);
(Continued)

(58) Field of Classification Search
CPC ........ Y02C 10/10; Y02C 10/04; B01D 53/22; B01D 53/228; B01D 2257/504; B01D 53/226; B01D 53/229; B01D 53/62; B01D 2256/22; B01D 2257/102; B01D 2257/104; B01D 2257/0283; B01D 53/1475; B01D 2251/306; B01D 2251/606; B01D 2252/10; B01D 2252/20478; F02C 7/00; F02C 3/34; F02C 10/04; H02K 7/1823; F23C 9/00; F23J 15/02; F23J 2215/50; F23L 7/007; F23L 2900/07001; Y02E 20/16; Y02E 20/18; Y02E 20/322; Y02E 20/344
See application file for complete search history.

(56) References Cited

U.S. PATENT DOCUMENTS 1,783,901 A * 12/1930 Bottoms .................. 423/228
4,350,511 A * 9/1982 Holmes et al. ............ 62/632
(Continued)

OTHER PUBLICATIONS

US 4,981,498, 02/1990, Bikson (withdrawn).*
(Continued)

*Primary Examiner* — Jason M Greene
*Assistant Examiner* — Anthony Shumate
(74) *Attorney, Agent, or Firm* — Timothy A. Hott; Kathi Bean; Janet Farrant

(57) ABSTRACT

A process involving membrane-based gas separation and power generation, specifically for controlling carbon dioxide emissions from gas-fired power plants. The process includes a compression step, a combustion step, and an expansion/electricity generation step, as in traditional power plants. The process also includes a sweep-driven membrane separation step and a carbon dioxide removal or capture step. The carbon dioxide removal step is carried out on a portion of gas from the compression step.

25 Claims, 6 Drawing Sheets

Related U.S. Application Data is a continuation-in-part of application No. 13/548,827, filed on Jul. 13, 2012, which is a continuation-in-part of application No. 13/115,726, filed on May 25, 2011, now Pat. No. 8,220,248, which is a continuation-in-part of application No. 13/122,136, filed as application No. PCT/US2010/002480 on Sep. 13, 2010, now Pat. No. 8,177,885, said application No. 13/548,827 is a continuation-in-part of application No. 13/122,136, filed as application No. PCT/US2010/002480 on Sep. 13, 2010, now Pat. No. 8,177,885.

(51) Int. Cl.
  *H02K 7/18* (2006.01)
  *B01D 53/62* (2006.01)
  *F02C 3/34* (2006.01)
  *F23C 9/00* (2006.01)
  *F23J 15/02* (2006.01)
  *F23L 7/00* (2006.01)
  *B01D 53/14* (2006.01)

(52) U.S. Cl.
  CPC .... *B01D 2251/306* (2013.01); *B01D 2251/606* (2013.01); *B01D 2252/10* (2013.01); *B01D 2252/20478* (2013.01); *B01D 2256/22* (2013.01); *B01D 2257/102* (2013.01); *B01D 2257/104* (2013.01); *B01D 2257/504* (2013.01); *B01D 2258/0283* (2013.01); *F23J 2215/50* (2013.01); *F23L 2900/07001* (2013.01); *Y02C 10/04* (2013.01); *Y02C 10/10* (2013.01); *Y02E 20/16* (2013.01); *Y02E 20/18* (2013.01); *Y02E 20/322* (2013.01); *Y02E 20/344* (2013.01)

(56) References Cited

U.S. PATENT DOCUMENTS

| | | | | |
|---|---|---|---|---|
| 4,371,381 | A * | 2/1983 | Schuftan | 62/630 |
| 4,462,814 | A * | 7/1984 | Holmes et al. | 62/625 |
| 4,639,257 | A * | 1/1987 | Duckett et al. | 62/624 |
| 4,761,164 | A | 8/1988 | Pez et al. | |
| 4,834,779 | A * | 5/1989 | Paganessi et al. | 95/44 |
| 4,923,493 | A * | 5/1990 | Valencia et al. | 62/629 |
| 4,931,070 | A * | 6/1990 | Prasad | 95/52 |
| 4,963,165 | A | 10/1990 | Blume et al. | |
| 4,990,168 | A * | 2/1991 | Sauer et al. | 62/624 |
| 5,034,126 | A * | 7/1991 | Reddy et al. | 210/321.74 |
| 5,233,837 | A * | 8/1993 | Callahan | 62/621 |
| 5,240,471 | A * | 8/1993 | Barbe et al. | 95/54 |
| 5,500,036 | A * | 3/1996 | Kalthod | 95/54 |
| 5,641,337 | A * | 6/1997 | Arrowsmith et al. | 95/39 |
| 5,681,433 | A * | 10/1997 | Friesen et al. | 203/39 |
| 5,843,209 | A * | 12/1998 | Ray et al. | 95/52 |
| 6,085,549 | A * | 7/2000 | Daus et al. | 62/624 |
| 6,478,852 | B1 * | 11/2002 | Callaghan et al. | 95/54 |
| 6,648,944 | B1 * | 11/2003 | Baker et al. | 95/39 |
| 6,695,983 | B2 * | 2/2004 | Prasad et al. | 252/373 |
| 6,702,570 | B2 * | 3/2004 | Shah et al. | 431/11 |
| 7,329,306 | B1 * | 2/2008 | Koch | 95/51 |
| 7,909,911 | B2 | 3/2011 | Lackner et al. | |
| 7,964,020 | B2 | 6/2011 | Baker et al. | |
| 8,016,923 | B2 | 9/2011 | Baker et al. | |
| 8,025,715 | B2 | 9/2011 | Wijmans et al. | |
| 8,034,168 | B2 | 10/2011 | Wijmans et al. | |
| 8,163,065 | B2 | 4/2012 | Lackner et al. | |
| 8,177,885 | B2 | 5/2012 | Wijmans et al. | |
| 8,220,247 | B2 | 7/2012 | Wijmans et al. | |
| 8,220,248 | B2 | 7/2012 | Wijmans et al. | |
| 8,246,718 | B2 | 8/2012 | Wijmans et al. | |
| 8,669,294 | B2 * | 3/2014 | Lien et al. | 518/700 |
| 8,734,569 | B2 * | 5/2014 | Hasse et al. | 95/51 |
| 8,829,059 | B2 * | 9/2014 | Wynn | 518/705 |
| 8,869,890 | B2 * | 10/2014 | Chinn et al. | 166/267 |
| 2003/0068260 | A1 * | 4/2003 | Wellington et al. | 422/192 |
| 2005/0011353 | A1 * | 1/2005 | Shirley | 95/45 |
| 2005/0028529 | A1 | 2/2005 | Bartlett et al. | |
| 2010/0126180 | A1 * | 5/2010 | Forsyth et al. | 60/780 |
| 2010/0236404 | A1 * | 9/2010 | Baker et al. | 95/46 |
| 2011/0005272 | A1 * | 1/2011 | Wijmans et al. | 62/617 |
| 2011/0200491 | A1 * | 8/2011 | Wijmans et al. | 422/169 |
| 2011/0262328 | A1 * | 10/2011 | Wijmans et al. | 423/210 |
| 2012/0055385 | A1 * | 3/2012 | Lien et al. | 110/345 |
| 2012/0118011 | A1 * | 5/2012 | Terrien et al. | 62/619 |
| 2012/0272657 | A1 | 11/2012 | Baker et al. | |
| 2013/0058853 | A1 | 3/2013 | Baker et al. | |
| 2013/0244190 | A1 * | 9/2013 | Marumoto et al. | 431/11 |
| 2014/0366724 | A1 * | 12/2014 | Wijmans et al. | 95/51 |

OTHER PUBLICATIONS

M. Anderson and Y.S. Lin, "Carbonate-ceramic dual-phase membrane for carbon dioxide separation", Journal of Membrane Science, vol. 357(1-2), pp. 122-129 (2010).*

J. Zou and W.S. Ho, "C02-selective polymeric membranes containing amines in crosslinked poly(vinyl alcohol)", Journal of Membrane Science, vol. 286, pp. 310-321 (2006).*

Gas Purification, A. Kohl and R. Nielsen (Fifth Edition, Gulf Publishing Co., Houston, Texas, 1997), pp. 1188-1237.

J. Zou and W.S. Ho, "CO2-selective polymeric membranes containing amines in crosslinked poly(vinyl alcohol)", Journal of Membrane Science, vol. 286, pp. 310-321 (2006).

* cited by examiner (not in accordance with the invention)

SWEEP-BASED MEMBRANE GAS SEPARATION INTEGRATED WITH GAS-FIRED POWER PRODUCTION AND CO2 RECOVERY

The present application is a continuation-in-part and claims the benefit of U.S. application Ser. No. 13/665,620, filed Oct. 31, 2012, which issued Apr. 14, 2015 as U.S. Pat. No. 9,005,335; which is a continuation-in-part and claims the benefit of U.S. application Ser. No. 13/548,827, filed Jul. 13, 2012; which is a continuation-in-part and claims the benefit of both (1) U.S. application Ser. No. 13/115,726, filed May 25, 2011, which issued Jul. 17, 2012, as U.S. Pat. No. 8,220, 248; which is a continuation-in-part and claims the benefit of U.S. application Ser. No. 13/122,136, filed Mar. 31, 2011, which issued May 15, 2012, as U.S. Pat. No. 8,177,885; which is a national stage application of, and claims the benefit of, PCT Application No. PCT/US10/02480, filed Sep. 13, 2010; and (2) U.S. application Ser. No. 13/122,136, filed Mar. 31, 2011, which issued May 15, 2012, as U.S. Pat. No. 8,177, 885; which is a national stage application of, and claims the benefit of, PCT Application No. PCT/US10/02480, filed Sep. 13, 2010; the entire contents of all of which applications are hereby incorporated by reference.

FIELD OF THE INVENTION

The invention relates to membrane-based gas separation processes, and specifically to processes using a sweep gas on the permeate side of the membrane to remove carbon dioxide from combustion gases. More particularly, the invention relates to integration of a membrane-based gas separation process into a gas-fired power plant.

BACKGROUND OF THE INVENTION

Many combustion processes produce flue gas emissions contaminated with carbon dioxide that contribute to global warming and environmental damage. Gas-fired power plants are an important source of such flue gases, and their emissions are particularly challenging to treat because the volume of flue gas generated is very large and the carbon dioxide concentration, is low.

In conventional power generation processes, a gaseous fuel (such as natural gas or syngas) is combusted in the presence of oxygen, producing a stream of hot, high-pressure gas. This hot, high-pressure gas is then used to drive one or more gas turbines, which in turn drive a generator, producing electrical energy. The exhaust gas from the turbines is still very hot and may contain as much as 50% of the energy generated by the combustion process. In the past, this remaining heat may simply have been dissipated in the form of hot exhaust gas.

A process flow diagram for a more modern conventional gas-fired power plant is shown in FIG. 6. An incoming air stream, 602, is compressed from atmospheric pressure to 20-30 bar, for example, in an air compressor unit, 609. The compressed gas, stream 603, is combusted with the incoming fuel gas, stream 601 (typically, but not necessarily, natural gas) in combustor, 604. The hot, high-pressure gas from the combustor, stream 607, is then expanded through the gas turbine section, 606. The gas turbine is mechanically linked to the air compressor, 609, and an electricity generator, 611. The low-pressure exhaust gas, stream 605, from the gas turbines is still hot. Optionally, some heat content from this gas can be recovered in a steam boiler, 612, which, in a combined cycle operation, explained below, is used to make additional electricity in a steam turbine.

A major plant design issue is the temperature of the gas entering the turbines. The temperature of the combusted gases can be in excess of 2,000° C. or 3,000° C., hot enough to melt the turbine blades if the gas were passed directly to the turbine. In most plants, therefore, the compressor train is designed to compress two or three times the volume of incoming air that is needed for the combustion step on a straight stoichiometric basis. The excess air passes through the combustor without reacting and acts as a diluent, thereby cooling combustor exhaust stream, 607, to a temperature at which it can safely be fed to the turbine. In the alternative, all or some of the excess air may bypass the combustor entirely, and may be used to dilute and cool the exhaust upstream of the turbine or within the turbine itself, as indicated by dashed line 610.

When excess air is used to dilute the combustion products, the exhaust gas stream, 613, from the turbine is correspondingly dilute in carbon dioxide, and may contain only 3-5% carbon dioxide. Recovery of carbon dioxide from this dilute, low-pressure, yet very high-volume gas stream is, difficult and very expensive. In recent years, modified designs in which a portion, 608, of the turbine exhaust gas is returned as cooling/diluent gas have been used. Using part of the exhaust gas in this way increases the carbon dioxide concentration in the final exhaust gas and reduces the volume of gas that must be treated if carbon dioxide recovery is to be attempted.

The amount of exhaust gas that can be recycled is limited by the oxygen content of the gas mixture 603 delivered to the combustion chamber. When excess fresh air is used as the diluent, this gas mixture contains about 21% oxygen; when exhaust gas is recycled, the oxygen content drops in proportion to the amount of exhaust gas in the mix. If the oxygen content drops below about 15%, however, changes to the turbine or combustor design may be required.

In recent years, there has been considerable interest in combined cycle power generation to improve energy efficiency in gas-fired power plants. A combined cycle power plant generates additional electricity by using the hot exhaust gas from a gas turbine in an HRSG (heat recovery steam generator) to boil water to make steam. The steam, in turn, is used to drive a steam turbine, generating additional electricity.

A combined cycle plant may use methane, from natural gas or other source, as fuel. In countries where coal, other hydrocarbon fuels or biomass are available, such feedstocks can be gasified to provide syngas to use as fuel for the plant. Steam created by cooling the raw syngas may be used in the steam turbine. Such processes are referred to as IGCC (integrated gasification combined cycle) processes. Combined cycle power generation processes of various types are well-known in the art and are described, for example, by Rolf Kehlhofer et al. in Combined-Cycle Cas & Steam. Power Plants (3.sup.rd ed., PennWell Corporation; Tulsa, Okla., 2009).

Combined cycle power generation is inherently more expensive than using a gas-turbine-only process, because additional equipment is required. However, over time, the value of the additional energy generated should offset the initially higher capital cost. As a result, most new gas power plants being built in North America and Europe are combined cycle.

Gas separation by means of membranes is a well-established technology. In an industrial setting, a total pressure difference is usually applied between the feed and permeate sides, typically by compressing the feed stream or maintaining the permeate side of the membrane under partial vacuum. This pressure difference provides a driving force for transmembrane permeation.

Although pressure-driven processes are the norm, it is known that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, the total pressure on the permeate side may be higher than on the feed side, or there may be additional driving force provided by keeping the total feed pressure higher than the total permeate pressure.

The use of a process including a membrane separation step operated in sweep mode for treating flue gas to remove carbon dioxide is taught in co-owned U.S. Pat. Nos. 7,964,020; 8,025,715; 8,246,718; 8,177,885; 8,220,247; 8,016.923; 8,034,168; and 8,220,248, as well as in co-owned and copending application Ser. No. 13/123,364, filed Apr. 8, 2011; Ser. No. 13/548,827, filed Jul. 13, 2012; and Ser. No. 13/665,620, filed Oct. 31, 2012.

Despite the improvements offered by the inventions described in the above patents and pending applications, there remains a need for better treatment techniques, especially techniques that can be integrated into gas-fired power plants, such as combined cycle and IGCC plants.

SUMMARY OF THE INVENTION

The invention is a process involving membrane-based gas separation and power generation, specifically for reducing carbon dioxide emissions from gas-fired power plants. The process can be applied to traditional plants, combined cycle plants incorporating HRSG, and IGCC plants. The process includes a compression step, a combustion step, and an expansion/electricity generation step, all as in conventional power plants, such as shown in the simple process schematic of FIG. 6.

The process also includes a sweep-driven membrane separation step to remove carbon dioxide from the turbine exhaust gas and return it with the incoming air to the compression step, as described in our patents and pending patent applications listed above. The process further includes a carbon dioxide removal or capture step. This step involves treating a portion of gas from the compression step, thereby generating a carbon-dioxide-rich stream that is withdrawn from the process, and leaving a treated, carbon-dioxide-depleted gas to be routed to the gas turbine intake as part of the cooling/diluent gas for the turbine.

The process represents an improvement over the processes that we have disclosed previously.

In U.S. Pat. No. 7,964,020 ("the '020 patent"), issued Jun. 21, 2011, we described a "serial" flue gas treatment process in which an exhaust stream from a combustion process is sent to a carbon dioxide capture step, which may utilize any separation technology suitable for recovering carbon dioxide from the exhaust stream. The off-gas stream from the capture step still contains carbon dioxide, but at a lower concentration than the raw exhaust stream. This off-gas stream is sent as the feed stream to a sweep-based membrane separation step that uses membranes selective in favor of carbon dioxide over oxygen and nitrogen. A sweep stream of air, oxygen-enriched air, or oxygen flows across the permeate side. Carbon dioxide from the off-gas stream permeates the membranes preferentially, and is taken up in the seep stream. The resulting combined permeate/sweep stream from the membrane separation step is directed to the combustion step, as at least part of the air intake to the process. The residue stream, containing low levels of carbon dioxide, is sent to the flue gas stack for venting to the atmosphere.

In U.S. Pat. No. 8,177,885 ("the '885 patent"), issued May 15, 2012, we described a flue gas treatment process for a gas-fired power plant in which a carbon dioxide capture step and a sweep-based membrane separation step are performed in parallel (rather than serially, as described in the '020 patent). That is, one portion of the exhaust stream from the combustion/power generation train is routed to a carbon dioxide capture step, and the other portion is routed to a sweep-based membrane separation step.

In U.S. Pat. No. 8,220,247 ("the '247 patent"), issued Jul. 17, 2012, we described a flue gas treatment process for a gas-fired power plant in which one portion of the turbine exhaust gas is returned as cooling/diluent gas to the combustor or the turbine inlet, a second portion is treated in a sweep-based membrane separation step, and a third portion is withdrawn as a partially concentrated carbon dioxide stream.

In U.S. Pat. No. 8,220,248 ("the '248 patent"), issued Jul. 17, 2012, we described a flue gas treatment process for a gas-fired power plant in which one portion of the turbine exhaust gas is returned as cooling/diluent gas to the combustor or the turbine inlet, and a second portion is treated serially, first in a membrane-based carbon dioxide capture step and then in a sweep-based membrane separation step.

In copending U.S. patent application Ser. No. 13/548,827 ("the '827 application"), filed Jul. 13, 2012, we described a flue gas treatment process for a gas-fired power plant in which part of the turbine exhaust gas is withdrawn at above atmospheric pressure and sent for treatment in a membrane-based carbon dioxide capture step followed by a sweep-based membrane separation step.

In copending U.S. patent application Ser. No. 13/665,620 ("the '620 application"), filed Oct. 31, 2012, we described a flue gas treatment process for a gas-fired power plant in which one portion of the turbine exhaust gas is treated in a membrane-based carbon dioxide capture step, and the carbon-dioxide-depleted stream from this step is treated along with a second portion of the turbine exhaust gas in a sweep-based membrane separation step.

In all of the above inventions, carbon dioxide removal or capture is carried out on the exhaust gas from the combustor and turbine(s). In other words, the carbon dioxide is removed and recovered from the raw flue gas.

We have now devised processes in which the carbon dioxide removal or capture step is carried out not on the raw flue gas, but on a portion of the compressed gas after it leaves the compressor and before it enters the gas turbine. We have found that such processes can achieve unexpectedly good results in terms of producing both a treated flue gas stream with very low carbon dioxide content and a recovered carbon dioxide stream with high carbon dioxide content.

These processes rely on the presence of the sweep-based membrane separation step as described in the '020 and other patents and applications mentioned above. This step returns an air stream containing a substantial concentration of carbon dioxide, such, as 10 vol %, 15 vol %, 20 vol % or more, to the air compressor train. Absent this step, the compressed air from the upstream compression step(s) would contain only the normal atmospheric concentration of carbon dioxide (300-400 ppmv), and, thus would not be appropriate for carbon dioxide removal/capture treatment.

Processes in which the carbon dioxide removal step is carried out on a portion, of the compressed air from the upstream compression step offer a number of beneficial features. First, the volume of gas to be treated in the removal/capture step is much smaller than the volume of gas leaving the combustor or turbines, thereby reducing the handling capacity of the equipment required to carry out the removal step.

Secondly, the gas from the compression steps is at high pressure, obviating the need for additional compression before the gas is passed to the carbon dioxide removal step.

Thirdly, the gas from the compression steps is at a much lower temperature than the combustion exhaust gas, thus reducing energy losses if the gas has to be cooled for treatment in the capture step.

Finally, the carbon-dioxide-depleted off-gas stream from the removal/capture step is directed to the gas turbines, not to the outside environment. Carbon dioxide that is not removed in this step will be returned in the loop provided by the sweep-based, membrane separation step. As a result, very high levels of carbon dioxide removal are not required in the capture step on a per-pass basis, thereby relaxing the operating constraints for this step. In fact, the processes of the invention can operate efficiently even if the carbon dioxide content of the off-gas from the capture step is as high as 5 vol % carbon dioxide, or higher, such as at least 7 vol %, 8 vol % or even 10 vol %.

In accordance with the general description above, a bask embodiment of the present invention includes the following steps:
(a) compressing an oxygen-containing stream in a compression apparatus, thereby producing a compressed gas stream;
(b) combusting a first portion of the compressed gas stream with a gaseous fuel in a combustion apparatus, thereby producing a combusted gas stream;
(c) separating a second portion of the compressed gas stream in a gas separation apparatus adapted to selectively remove carbon dioxide, thereby producing a carbon-dioxide enriched stream and a carbon-dioxide-depleted stream;
(d) routing the carbon-dioxide-depleted stream and the combusted gas stream as first and second working gas streams to a gas turbine apparatus mechanically coupled to an electricity generator, and operating the gas turbine apparatus, thereby generating electric power and producing a turbine exhaust stream;
(e) passing at least a first portion of the turbine exhaust stream to a sweep-based membrane separation step, wherein the sweep-based membrane separation step comprises:
(i) providing a membrane having a feed side and a permeate side, and being selectively permeable to carbon dioxide over nitrogen and to carbon dioxide over oxygen,
(ii) passing the first portion of the turbine exhaust stream across the feed side,
(iii) passing air, oxygen-enriched air, or oxygen as a sweep stream across the permeate side,
(iv) withdrawing from the feed side a residue stream that is depleted in carbon dioxide compared to the turbine exhaust stream,
(v) withdrawing from the permeate side a permeate stream comprising oxygen and carbon dioxide; and
(f) passing the permeate stream to step (a) as at least a portion of the oxygen-containing gas.

Step (b) may be carried out using any combustible gas, such as natural gas, hydrogen or syngas, or even a vaporized hydrocarbon liquid, as fuel.

Step (c) captures carbon dioxide, which is removed from the process in the form of a concentrated stream, typically containing greater than 70 vol %, 80 vol % or more carbon dioxide. This stream may be sent for liquefaction, sequestration or any other use.

The carbon dioxide removal step preferably comprises at least one process selected from the group consisting of absorption, adsorption, liquefaction, and membrane separation. Preferred choices include membrane separation and physical or chemical absorption, optionally followed by liquefaction.

In the case that membrane separation is used, the gas separation apparatus will incorporate a membrane separation unit containing membranes selectively permeable to carbon dioxide over nitrogen and oxygen. Various types of membranes, including ceramic membranes, polymeric membranes and molten salt membranes can be used.

In the case that absorption is used, the gas separation apparatus will typically incorporate a scrubbing column for contacting the gas with a sorbent and a stripping column for regenerating the sorbent and releasing a high-concentration carbon dioxide stream. Preferred sorption processes include the Benfield process, using potassium carbonate as sorbent, and amine-based processes.

After compression, the gas that is to be routed to the gas separation apparatus will generally be at a high temperature, such as 500° C. or more. Depending on the preferred operating conditions for the gas separation apparatus, it may be desirable to cool the compressed gas stream, such as by heat exchange against other process streams, before it passes as feed to the carbon dioxide removal/capture step. Likewise, the gas will be at high pressure, generally 20 bar, 30 bar or more, and the pressure may be adjusted as need be to meet the operating preferences of the gas separation step/apparatus.

Step (e) is carried out as described in the '020 patent and the other patents and pending applications listed above. Specifically, at least a portion of the turbine exhaust gas is passed across the feed side of a membrane separation unit that contains membranes selectively permeable to carbon dioxide over nitrogen and to carbon dioxide over oxygen.

The exhaust stream flows across the feed side of the membranes, and a sweep gas of air, oxygen-enriched air, or oxygen flows across the permeate side, to provide or augment the driving force for transmembrane permeation. The sweep stream picks up the preferentially permeating carbon dioxide. The combined sweep/permeate stream is withdrawn from the membrane unit and directed to the combustor to form at least part of the air, oxygen-enriched air, or oxygen feed to the combustion step.

Absent the sweep-based membrane separation step, the incoming fresh air to the compressor and combustor would contain the normal atmospheric content of carbon dioxide (300-400 ppmv). The membrane permeate/sweep stream is enriched in carbon dioxide by 2-3 orders of magnitude compared with atmospheric air, and will preferably contain at least about 10 vol % carbon dioxide, more preferably at least about 15 vol % carbon dioxide or even higher, such as 20 vol % or above.

It is the great enrichment of carbon dioxide in the incoming air or oxygen stream brought about by step (e) that enables this composition-adjusted air stream to be tapped as the source stream for carbon dioxide removal and capture for the overall process. Prior art power plants that do not make use of a sweep-based membrane separation step are only able to remove carbon dioxide from the post-combustion or post-turbine exhaust gas, and therefore cannot take advantage of the combined benefits of low volume, high concentration, high pressure, and modest temperature mentioned above.

The residue stream withdrawn per step (e)(iv) forms the treated flue gas produced by the process, and is usually discharged to the environment via the power plant stack. The carbon dioxide content is preferably less than about 2 vol %; more preferably less than about 1 vol %, and most preferably no greater than about 0.5 vol %. The reduction of the carbon dioxide content to 20%, 10%, or less of the conventional content of flue gas from a gas-fired power plant greatly reduces the environmental impact of the plant.

The process of the invention can be carried out in all types of gas-fired power plants. In combined cycle plants, the gas turbine exhaust gas stream will be directed through an HRSG operation between steps (d) and (e), so that the feed gas to the sweep-based membrane separation step is the exhaust gas from the steam generator.

The process schemes discussed above involve splitting the compressed gas stream into two portions, one to be sent to the combustor, the other to the gas separation apparatus for carbon dioxide recovery. Optionally, the compressed gas stream may be split into three portions, and the third portion passed directly to the gas turbine inlet as working gas, without passing through either the carbon dioxide removal step (e) or the combustion step (b).

As with the embodiments described in our earlier '247 and '248 patents, a portion of the turbine exhaust stream may optionally be diverted and returned to the compression train without passing through the sweep-based membrane separation step(s). In this case, the compression step (a) may optionally be carried out in a compression train or apparatus that includes two discrete compressors, both coupled to the gas turbine(s), typically on the same shaft.

One portion of the turbine exhaust gas is then sent as feed to the sweep-based membrane separation step, and the resulting permeate/sweep stream is returned to one compressor as in step (f). The compressed gas from this compressor is sent to the combustion step (b). The other portion of the turbine exhaust is diverted upstream of the sweep-based membrane separation step and sent to the other compressor. The compressed gas from this compressor is directed to the gas separation apparatus, as in step (c).

In this aspect, the invention includes the following steps;
(a) compressing an oxygen-containing stream in a first compression apparatus, thereby producing a first compressed gas stream;
(b) compressing a carbon-dioxide-containing gas stream in a second compression apparatus, thereby producing a second compressed gas stream;
(c) combusting the first compressed gas stream in a combustion apparatus, thereby producing a combusted gas stream;
(d) separating the second compressed gas stream in a gas separation apparatus adapted to selectively remove carbon dioxide, thereby producing a carbon-dioxide enriched stream and a carbon-dioxide-depleted stream;
(e) routing the carbon-dioxide-depleted stream and the combusted gas stream as first and second working gas streams to a gas turbine apparatus mechanically coupled to an electricity generator, and operating the gas turbine apparatus, thereby generating electric power and producing a turbine exhaust stream;
(f) passing at least a first portion of the turbine exhaust stream to a sweep-based membrane separation step, wherein the sweep-based membrane separation step comprises:
(i) providing a membrane having a feed side and a permeate side, and being selectively permeable to carbon dioxide over nitrogen and to carbon dioxide over oxygen,
(ii) passing the first portion of the turbine exhaust stream across the feed side,
(iii) passing air, oxygen-enriched air, or oxygen as a sweep stream across the permeate side,
(iv) withdrawing from the feed side a residue stream that is depleted in carbon dioxide compared to the turbine exhaust stream,
(v) withdrawing from the permeate side a permeate stream comprising oxygen and carbon dioxide,
(g) passing the permeate stream to step (a) as at least a portion of the oxygen-containing gas; and
(h) passing a second portion of the turbine exhaust gas to step (b) as at least a portion of the carbon-dioxide-containing gas.

DETAILED DESCRIPTION OF THE INVENTION

Gas percentages given herein are by volume unless stated otherwise.

Pressures as given herein are in bar absolute unless stated otherwise.

The term air as used herein refers to any oxygen-containing gas used to combust fuel according to the processes of the invention.

The invention is a process involving membrane-based gas separation and power generation, specifically for controlling carbon dioxide emissions from gas-fired power plants, including traditional plants, combined cycle plants incorporating HRSG, and IGCC plants. The process includes a compression step, a combustion step, and an expansion/electricity generation step, as in traditional power plants. The process also includes a sweep-driven membrane separation step and a carbon dioxide removal or capture step. Besides generating electric power, the process yields two gas streams: a vent or flue gas stream of low carbon dioxide concentration that can be sent to the power plant stack, and a carbon dioxide product stream of high concentration that can be sent for purification and/or sequestration.

Figure 1:
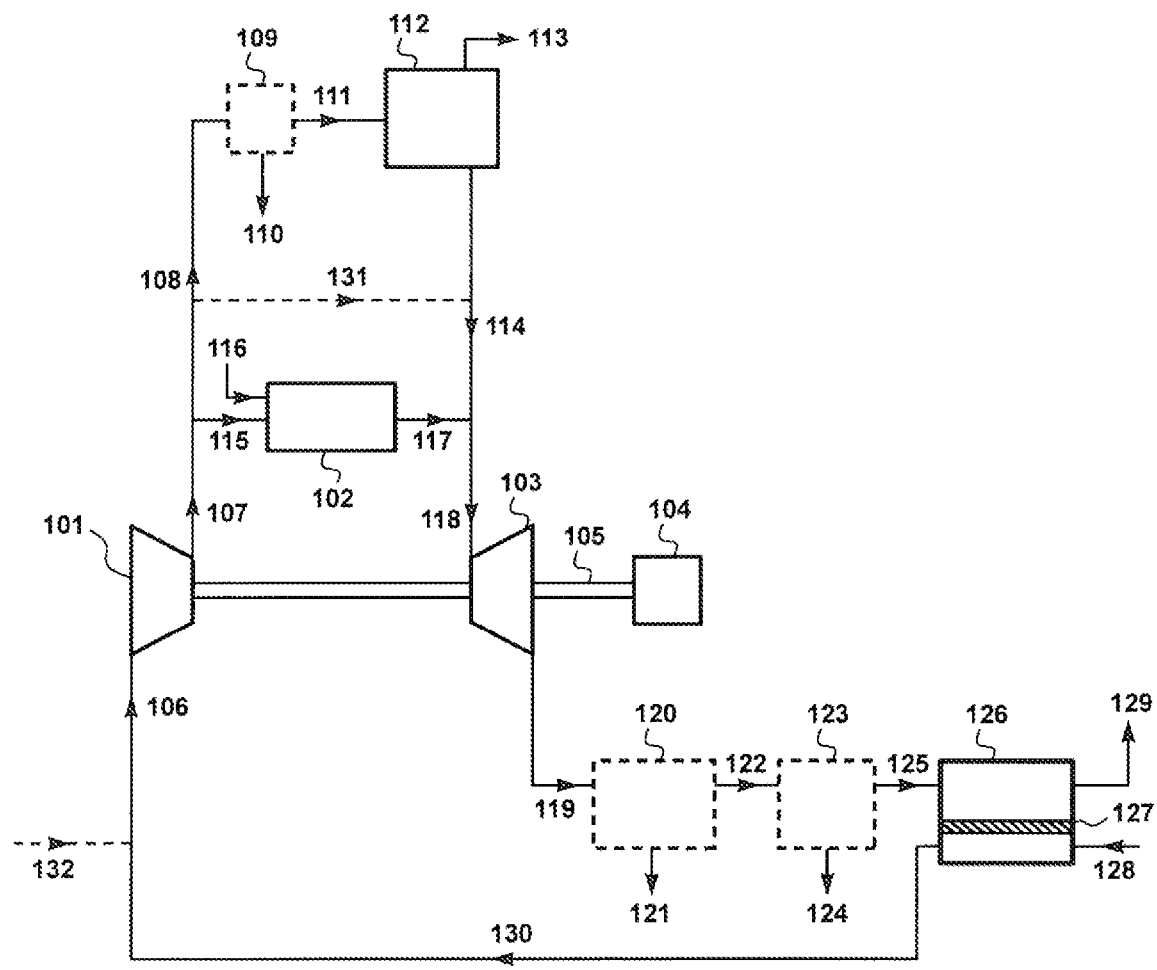
FIG. 1 is a schematic drawing showing a basic equipment and process flow scheme for the process of the invention.

A simple flow scheme for a basic embodiment of a gas separation and power generation process in accordance with the invention is shown in FIG. 1. It will be appreciated by those of skill in the art that FIG. 1 and the other figures showing process schemes herein are very simple block diagrams, intended to make clear the key unit operations of the processes of the invention, and that actual process trains may include additional steps of a standard type, such as heating, chilling, compressing, condensing, pumping, monitoring of pressures, temperatures, flows, and the like. It will also be appreciated by those of skill in the art that the unit operations may themselves be performed as multiple steps or in a train of multiple pieces of equipments.

Referring to FIG. 1, air is introduced into the process as stream 128 and flows as a sweep stream across the permeate side of the sweep-driven membrane separation unit, 126, discussed in more detail below. The permeate stream, 130, comprises both the sweep gas and carbon dioxide that has permeated the membranes, 127, and preferably has a carbon dioxide content of at least about 10 vol %, more preferably at least about 15 vol % and most preferably at least about 20 vol %. Stream 130 passes, with optional addition of make-up air, stream 132, as air intake stream, 106, to compression step, 101.

The compression step is carried out in one or multiple compressors, and produces compressed stream, 107, at a typical pressure of a few tens of bar, such as 20 bar or 30 bar. This stream is split into two portions, streams 115 and 108. Stream 115 is introduced with fuel stream, 116, into combustion step or zone, 102. Natural gas, other methane-containing gas, syngas, hydrogen, or any other fuel capable of burning in air may be used. Combustion produces hot, high-pressure gas, stream 117.

In a traditional gas-fired combustion process, the exhaust gas from the combustor typically contains about 4 or 5 vol % carbon dioxide. In our process, carbon dioxide is recycled via stream 130/106, as discussed in more detail below. As a result, the concentration of carbon dioxide in stream 117 is higher than in a tradition natural gas fired plant, and is frequently as high as at least about 10 vol %, or even at least 15 vol %, 20 vol % or more.

Stream 108 is directed to gas separation step, 112, where carbon dioxide is captured and removed from the process via stream 113. Depending on the operating temperature of the separation equipment, stream 108 may be cooled by heat exchange or otherwise in optional cooling step, 109, to produce cooled stream 111. Water condensed as a result of the cooling may be removed as stream 110.

Various considerations affect the choice of technology and operating methodology for step 112. In steady state, the mass of carbon dioxide removed from the process in streams 113 and 129 equals the mass of carbon dioxide generated by combustion. Preferably, at least 50%, and more preferably at least 80% or 90%, of the generated carbon dioxide should be captured into stream 113.

Nevertheless, very high levels of removal of carbon dioxide from the inlet gas stream, 108 or 111, by gas separation step 112 are not required, because the off-gas, stream 114, is not vented to the atmosphere, but is directed to sweep-based membrane separation step, 126. The sweep-based membrane separation step recycles carbon dioxide in stream 106, so that the carbon dioxide concentration in stream 111 tends to be relatively high, such as 15 vol %, 20 vol % or more. Only a portion of this recirculating carbon dioxide needs to be removed into stream 113 to achieve the target high levels of carbon dioxide capture. This is a significant advantage of the process, as step 112 can then be operated using relatively low-cost, low-energy options.

Step 112 can be carried out by means of any technology or combination of technologies that can create a concentrated carbon dioxide stream from stream 111. Representative methods that may be used include, but are not limited to, physical or chemical sorption, membrane separation, compression/low temperature condensation, and adsorption. All of these are well known in the art as they relate to carbon dioxide removal from gas mixtures of various types. However, based on the considerations discussed above, the preferred technologies are absorption and membrane separation.

Step 112 produces a concentrated carbon dioxide stream, 113, which is withdrawn from the process. In addition to meeting the specified preferred capture targets, this stream has a relatively high carbon dioxide concentration, and preferably contains greater than 70 or 80 vol % carbon dioxide. Most preferably, this stream contains at least about 90 vol % carbon dioxide. Thus, unusually, the process achieves in one stream both high levels of carbon dioxide capture and high carbon dioxide concentration.

After withdrawal from the process, stream 113 may pass to any desired destination. The high concentration facilitates liquefaction, transport, pipelining, injection and other forms of sequestration.

The off-gas stream, 114, from the carbon dioxide removal or capture step still contains carbon dioxide, but at a lower concentration than the compressed gas stream, 111. Typically, but not necessarily, this concentration is at least about 5 vol %, and can be up to about 1 vol % or even more.

Stream 114 and stream 117 are sent, either individually, or as mixed working gas stream, 118, to gas turbine section, 103. This section contains one or more commonly multiple gas turbines, which are coupled by means of shaft, 105, to compressor(s) 101 and to electricity generator, 104. The working gas drives the gas turbines, which in turn drive the generator and produce electric power.

The low-pressure exhaust gas from the turbines, stream 119, is still hot, and is optionally and preferably directed to a heat recovery steam generator, 120. This section includes a boiler that produces steam, 121, which can be directed to a steam turbine. Gas exiting the steam generator, stream 122, is routed as feed gas to sweep-based membrane separation step, 126. If it is necessary to cool the turbine exhaust gas before passing it to the membrane unit, this may be done by heat exchange or otherwise in cooling step, 123. Any condensed water may be removed as stream, 124. After passing through optional HRSG, 120, optional cooling step, 123, or both, the turbine exhaust stream now passes as feed stream, 125, to sweep-based membrane separation step 126.

Step 126 is carried out using membranes that are selective in favor of carbon dioxide over oxygen and nitrogen. It is preferred that the membranes provide a carbon dioxide/nitrogen selectivity of at least about 10, and most preferably at least about 20 under the operating conditions of the process. A carbon dioxide/oxygen selectivity of at least 10 or 20 is also preferred. A carbon dioxide performance of at least about 300 gpu, more preferably at least about 500 gpu and most preferably at least about 1,000 gpu is desirable. The permanence does not affect the separation performance, but the higher the permeance, the less membrane area will be required to perform the same separation.

Any membrane with suitable performance properties may be used. Many polymeric materials, especially elastomeric materials, are very permeable to carbon dioxide. Preferred membranes for separating carbon dioxide from nitrogen or other inert gases have a selective layer based on a polyether. A number of such membranes are known to have high carbon dioxide/nitrogen selectivity, such as 30, 40, 50 or above. A representative preferred material for the selective layer is Pebax®, a polyamide-polyether block copolymer material described in detail is U.S. Pat. No. 4,963,165.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules and potted hollow-fiber modules. The making of all these types of membranes and modules is well known in the art. We prefer to use flat-sheet membranes in spiral-wound modules.

Step 126 may be carried out in a single bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multi-stage, multistep, or more complicated arrays of two or more units in serial or cascade arrangements.

Stream 125 flows across the feed side of the membranes, and sweep gas stream, 128, of air, oxygen-enriched air or oxygen flows across the permeate side. The gas flow pattern within the membrane modules should preferably, although not necessarily, be such, that flow on the permeate side is at least partly or substantially countercurrent to flow on the feed side.

In membrane gas separation processes, the driving force for transmembrane permeation is supplied by lowering the partial pressure of the desired permeant on the permeate side to a level below its partial pressure on the feed side. The use of the sweep gas stream 128 maintains a low carbon dioxide partial pressure on the permeate side, thereby providing driving force.

The partial pressure of carbon dioxide on the permeate side may be controlled by adjusting the flow rate of the sweep stream. High sweep flow rates will achieve maximum carbon dioxide removal from the membrane feed gas, but a comparatively carbon dioxide dilute permeate stream (that is, comparatively low carbon dioxide enrichment in the sweep gas exiting the modules). Low sweep flow rates will achieve high concentrations of carbon dioxide in the permeate, but relatively low levels of carbon dioxide removal from the feed.

Typically and preferably, the flow rate of the sweep stream should be between about 50% and 200% of the flow rate of the membrane feed stream, and most preferably between about 80% and 120%. Often a ratio of about 11 is convenient and appropriate.

The total gas pressures on each side of the membrane may be the same or different, and each may be above or below atmospheric pressure. If the pressures are about the same, the entire driving force is provided by the sweep mode operation. Optionally, stream 125 may be supplied to the membrane unit at slightly elevated pressure, by which we mean at a pressure of a few bar, such as 2 bar, 3 bar or 5 bar. If this requires recompression of stream 125, a portion of the energy used for the compressors may be recovered by expanding the residue stream, 129, in a turbine.

The membrane separation step divides stream 125 into residue stream, 129, depleted in carbon dioxide, and permeate/sweep stream, 130. The residue stream forms the treated flue gas produced by the process, and is usually discharged to the environment via the power plant stack. The carbon dioxide content of this stream is preferably less than about 2 vol %; more preferably less than about 1 vol %, and most preferably no greater than about 0.5 vol %.

The permeate/sweep stream, 130, preferably containing at least 10 vol % carbon dioxide, and more preferably at least about 15 vol % carbon dioxide, is withdrawn from the membrane unit and is passed to the compression unit to form at least part of the air, oxygen-enriched air or oxygen feed to the combustion step.

The process as described above involves splitting the incoming compressed air stream 107 into two streams, 108 and 115. Optionally, stream 107 may be split into three portions, and the third portion, indicated by dashed line 131, may bypass both the combustor and the gas separation apparatus and be sent directly to the gas turbine intake.

Figure 2:
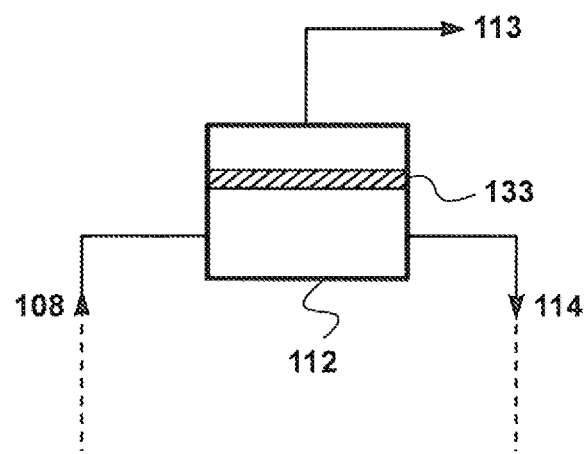
FIG. 2 is an expanded view of the gas separation section of the invention, in which a carbon-dioxide-selective membrane separation unit is used.
Figure 3:
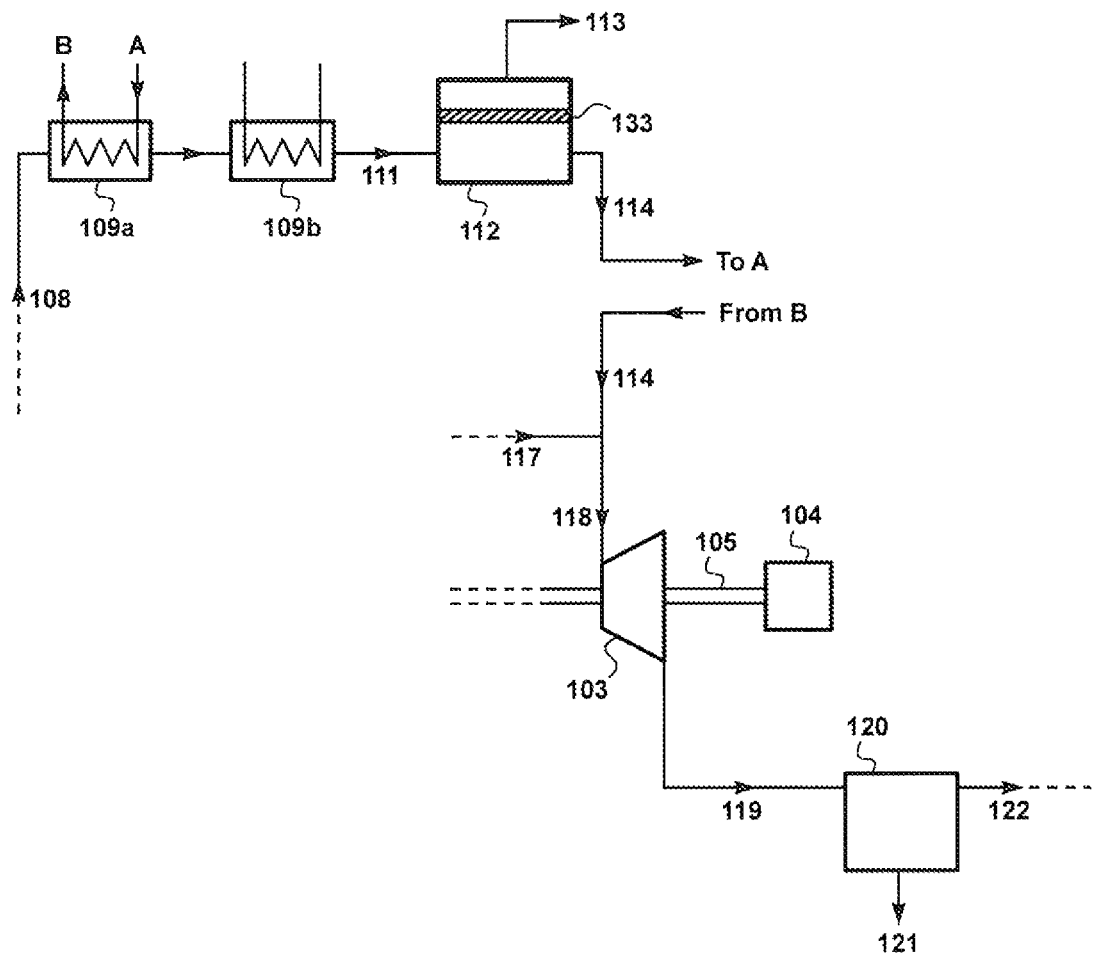
FIG. 3 is an expanded view of the gas separation section of the invention, in which a carbon-dioxide-selective membrane separation unit is used, and in which cooling of the feed to the membrane unit is achieved by heat integration.
Figure 4:
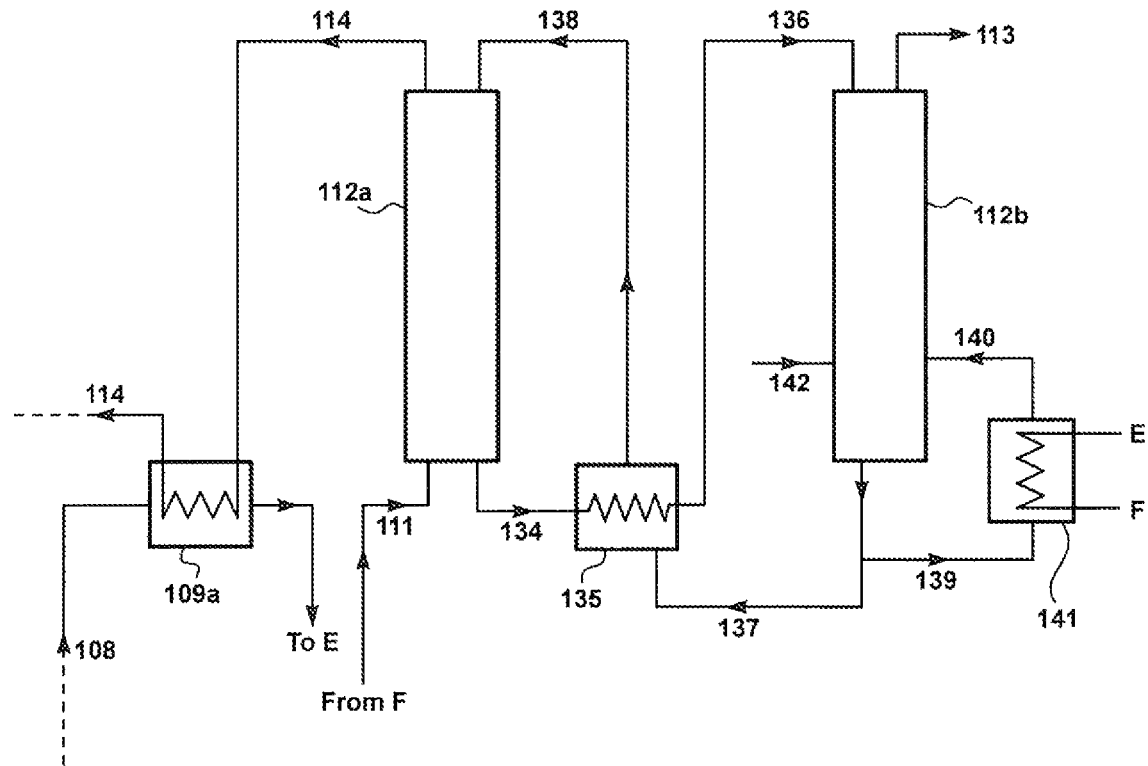
FIG. 4 is an expanded view of the gas separation section of the invention, in which absorption by a carbon-dioxide-selective sorbent is used.

As mentioned above, the preferred methods for carrying out the gas separation or carbon dioxide removal/capture step include membrane separation and absorption. FIGS. 2, 3 and 4 show a breakout of step 112 of FIG. 1, as it may be carried out according to these preferred methods.

FIG. 2, in which like elements are labeled as in FIG. 1, shows step or unit 112 in the case that membrane separation is used for this step. In this case, stream 108 is passed as a feed stream across membranes 133. The membranes are selective in favor of carbon dioxide over nitrogen and oxygen, with preferred selectivity and permeance characteristics similar to those already mentioned with respect to the sweep-based membrane separation step, 126.

As with step 126, any membranes capable of providing adequate separation of carbon dioxide from the feed stream may be used Suitable membranes include inorganic membranes, particularly ceramic membranes, and molten salt membranes, both of which types may be operated at high temperatures. Such membranes are known in the art and described, for example, in M. Anderson and Y. S. Lin, "Carbonate-ceramic dual-phase membrane for carbon dioxide separation", *Journal of Membrane Science*, Vol. 357(1-2), pages 122-129 (2010), and in LLS. U.S. Pat. Nos. 4,761,164; 7,909,911 and 8,163,065. Other suitable membranes include polymeric membranes, such as those discussed above with respect to the sweep-dn en membrane separation step, 126. Yet other membranes include facilitated transport membranes, especially those able to operate at elevated temperature, such as those taught in J. Zou and W. S. Ho, "$CO_2$-selective polymeric membranes containing amines in crosslinked polyvinyl alcohol)", *Journal of Membrane Science*, Vol. 286, pages 310-321 (2006).

Stream 108 is hot from the compression step, and may be at a temperature of 400° C., 500° C. or more. If ceramic or molten salt membranes are used, it may be possible to pass stream 108 into the membrane unit without cooling, and to operate the membrane separation step at high temperature. For example, molten salt membranes, using a tetraalkylammonium carboxylate, or a mixture of lithium carbonate/sodium carbonate/potassium carbonate as the molten salt, with the salt immobilized within the pores of a ceramic support, may be operated at 500° C. or above.

On the other hand, if polymeric membranes are used, it will be necessary to cool stream 108 to a temperature at which the separation capability and mechanical integrity of the membranes will not be compromised. This temperature will vary with the materials used, but in general it is preferred that the stream be cooled to below 100° C., such as to 30° C., 40° C., 50° C. or 60° C. While the cooling can be achieved in any convenient fashion, it is preferred to practice heat integration within the process.

FIG. 3 shows a representative example using membrane separation for the carbon dioxide removal step, 112, with heat integration used to cool the incoming feed stream, Like elements are numbered as in FIGS. 1 and 2. Referring to FIG. 3, compressed stream 108 is passed through cooling step 109, as shown in FIG. 1, in this case carried out in two heat exchange steps, 109a and 109b. In step 109a, stream 108 is run against membrane residue stream, 114, with stream 114 entering the heat exchanger as indicated at position A and exiting at position B. In step 109b, additional cooling of stream 108 is provided before it passes to the membrane unit. It is convenient to use a portion of the incoming water for the steam generator unit 120 as the cooling agent here, as this will serve to preheat the water and allow the energy content lost to the turbine by cooling gas 108 to be recovered in the subsequent steam turbine. Cooled stream 111 then passes as feed in membrane separation step 112.

FIG. 4 shows a representative, non-limiting, arrangement in the case that gas separation step 112 is an absorption process, such as a hot potassium carbonate or an amine scrubbing process. Referring to FIG. 4, in which like elements are labeled as in FIG. 1, the absorption process is carried out using two separation columns, 112a and 112b. Column 112a is a scrubbing, or absorption column; column 112b is a stripping, desorption or regeneration column.

As with the membrane separation processes described above, it may be necessary to cool stream 108 before introducing it to the scrubbing column. Stream 108 is passed first into heat exchange step 109a, where it is cooled against the carbon-dioxide-depleted stream, 114, exiting the top of the absorption column 112a. Further cooling is provided by running stream 108 as a heating stream in reboiler, 141, at the bottom of column 112b. Thus stream 108 enters the reboiler at position E and exits at position F.

The resulting cooled stream, 111, passes into column 112a. Lean sorbent solution stream, 138, flows down the column against the upcoming gas stream. Carbon dioxide is sorbed preferentially into the sorbent solution. Carbon-dioxide-depleted stream 114 exits the top of the column and is passed on, via heat exchanger 109a, to the gas turbines as shown in FIG. 1.

Carbon-dioxide-laden sorbent, stream 134, leaves the base of the column, passes through heat exchanger 135, and enters the top of the regeneration column, 112b, as stream 136. In column 112b, the sorbent may be regenerated simply by heating, by lowering the pressure below that of column 112a, by stripping with steam or any other appropriate stripping agent, or by combinations of such methods. Fresh stripping agent may be introduced into the column as optional stream 142. Regenerated solvent is withdrawn from the bottom of the column as stream 137, and after passing through heat exchanger, 135, returns to column 112a as lean sorbent stream 138.

In a typical process, such as one involving simple thermal regeneration or steam regeneration, a portion of the bottoms stream is directed as stream 139 through the reboiler and returned to the column as stream 140.

Stream 113 is removed from the top of the column as the carbon dioxide product stream. If steam stripping has been used, stream 113 is cooled to condense water, which may be returned to the column as a reflux stream, before discharge of the carbon dioxide from the process.

Preferred operating conditions for the two columns are familiar to those of skill in the art. In the event that an amine-scrubbing process is used, the amine-based sorbent may include a single alkanolamine or a mix of amines. The scrubbing or sorption column is typically operated at about 30-50° C. and at about 20 bar. The stripping or regeneration column is operated at 2-5 bar, with the reboiler at about 120° C.

Very detailed descriptions of amine-based processes can be found in the literature, for example in *Gas Purification*, A. Kohl and R. Nielsen (Fifth Edition, Gulf Publishing Co., Houston, Tex., 1997), pages 1188-1237. A representative process of this type is the Fluor Daniel Econamine FG™ process, which uses a monoethanolamine (MEA) based sorbent system.

In the event that a carbonate-based sorbent, such as hot potassium carbonate, is used, the most widely used process is the Benfield process, developed by UOP in the 1950s, and extensively described in the literature. Variants of the process are available; in a typical embodiment the sorption column is operated at high pressure, such as 20 bar for example, and at moderate temperature, such as about 40-80° C. The regeneration column can operate by thermal stripping, achieved by raising the temperature in the stripping column to about 120-150° C. The column can be run under pressure, so that the carbon dioxide product exits the top of the column at about 2-5 bar, for example.

Figure 5:
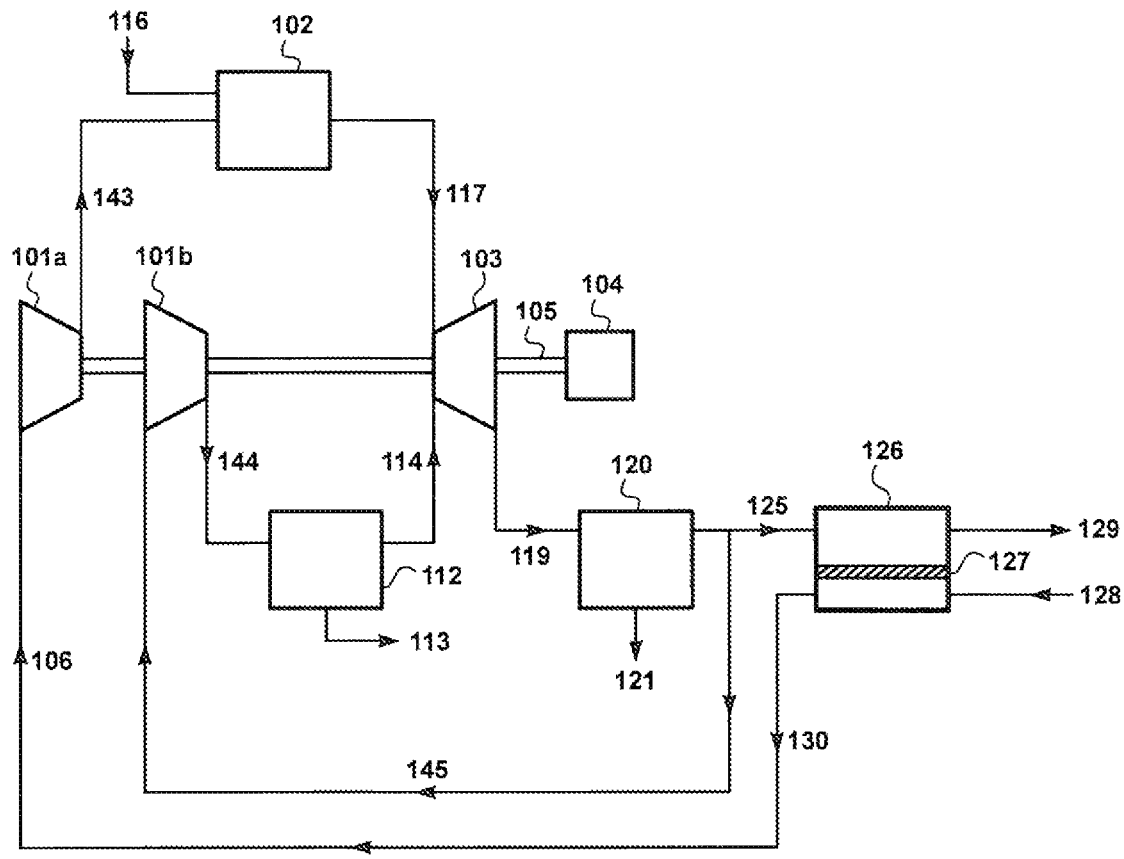
FIG. 5 is a schematic drawing of an embodiment of the invention in which two discrete compressors are used.
Figure 6:
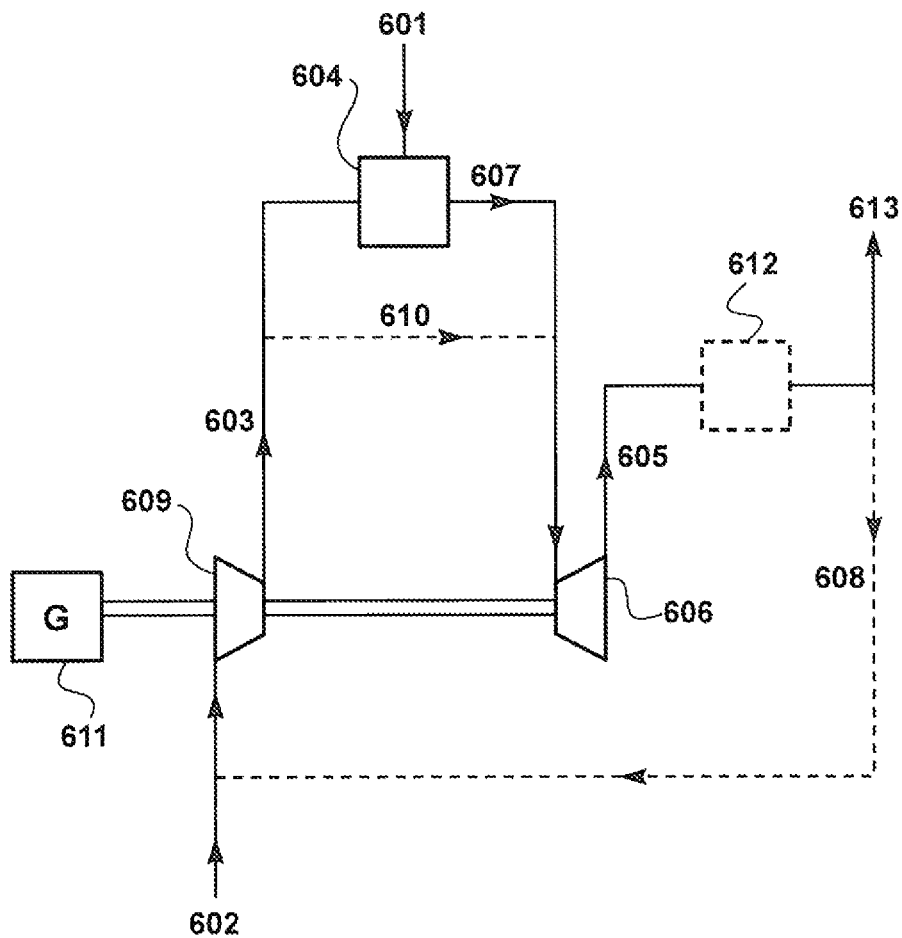
FIG. 6 is a schematic drawing of a flow scheme for a conventional gas-fired power plant, not in accordance with the invention.

An embodiment of the invention in which a portion of the turbine exhaust stream is returned to the compression train without passing through the sweep-based membrane separation step is shown in FIG. 5. Referring to this figure, in which like elements are labeled as in FIG. 1, the compression step is carried out in two discrete sub-steps, 101a and 101b. The compressors in both sub-units are mounted on the shaft 105 and coupled to the gas turbines, 103 and the electricity generator, 104.

Step 101a is used to compress the incoming permeate/air sweep stream, 106. The resulting compressed adjusted air stream, 143, is directed to the combustion step, 102.

Compression step 101b is used to compress the portion, 145, of turbine exhaust stream, 119, that is not sent to the sweep-driven membrane separation step, 126. The compressed gas stream, 144, from this step is directed to the gas separation step or apparatus, 112, As can be seen from the figure, the use of two discrete compressors creates two flow loops within the process, one bringing in air to the combustor via stream 130/106, the other bringing carbon dioxide to the gas separation, carbon dioxide removal step 112.

The use of the two flow loops increases the process flexibility. The amount of gas being processed by the sweep-based membrane separation step can be reduced substantially, while still maintaining low levels of carbon dioxide in the residue gas sent to the stack. For example, as much as 25%, 30% or even 50% or more of the turbine exhaust gas may be directed to compressor 101b and carbon dioxide removal step 112, while achieving a concentration of below 1 vol % carbon dioxide in the stack gas. Because the volume of gas in stream 125 is much lower than in embodiments of the FIG. 1 type, it can become more acceptable to compress stream 125 to a few bar above atmospheric pressure before sending it to the membrane unit.

The invention is now farther described by the following examples, which are intended to be illustrative of the invention, but are not intended to limit the scope or underlying principles in any way.

EXAMPLES

Calculation Methodology

The computer calculations in all of the following Examples were performed using a modeling program, ChemCad 6.6 (ChemStations, Inc., Houston, Tex.) which was modified with differential element subroutines for the membrane separation steps (as applicable). For the calculations, all compressors and vacuum pumps were assumed to be 75% efficient. In each case, the modeling calculation was performed to achieve about 90% recovery of carbon dioxide from the flue gas stream.

Example 1

Polymeric Membrane Permeation Experiments

Sets of representative permeation experiments were performed with two different composite membranes, each having a polyether-based selective layer. The properties of the membranes as measured with a set of pure gases at 6.7 bar absolute and 30° C. are shown in Tables 1 and 2.

TABLE 1

| Gas | Permeance (gpu)* | $CO_2$/Gas Selectivity |
|---|---|---|
| Carbon dioxide | 1,000 | — |
| Nitrogen | 20 | 50 |
| Oxygen | 40 | 25 |
| Methane | 50 | 20 |
| Water | >2,000** | — |

*Gas permeation unit; 1 gpu = 1 × $10^{-6}$ $cm^3$(STP)/$cm^2$ · s · cmHg
**Estimated, not measured

TABLE 2

| Gas | Permeance (gpu)* | $CO_2$/Gas Selectivity |
|---|---|---|
| Carbon dioxide | 1,000 | — |
| Nitrogen | 30 | 33 |
| Oxygen | 60 | 17 |

Example 2

Molten Salt Membranes Used for Gas Separation Step

A calculation was performed to model the performance of the process of the invention in accordance with the design shown in FIG. 1. The process was assumed to use natural gas as fuel, and to include an HRSG. The fuel and air streams were sized to be consistent with a typical plant producing 500 MWe of power.

The sweep-based membrane separation step 126 was assumed to be carried out using polymeric membranes having a carbon dioxide/nitrogen selectivity of 50 and carbon dioxide/oxygen selectivity of 25. The membranes were assumed to be optimized to give a carbon dioxide permeance of 5,000 gpu.

The permeate/sweep air stream was assumed to be compressed to 30 bar, and then split in a 70:30 ratio, with 70% being sent as stream 115 to the combustor and 30% being directed as stream 108 to the carbon dioxide removal step, 112.

Step 112 was assumed to be carried out using molten salt membranes operating at a temperature of about 530° C. The permeate side of the membranes was assumed to be maintained at 1 bar absolute. The molten salt membranes were assumed to provide a carbon dioxide/nitrogen selectivity of 100 and carbon dioxide/oxygen selectivity of 50. The carbon dioxide permeance was assumed to be 1,000 gpu. The results of the calculation are shown in Table 3.

TABLE 3

| | Stream/number | | | | | | | | |
|---|---|---|---|---|---|---|---|---|---|
| | Fuel 116 | Sweep gas 128 | Compressor feed 106 | Feed to capture step 108 | Feed to combustion step 115 | Turbine exhaust 119 | Membrane feed 125 | CO2 permeate 113 | Membrane residue 129 |
| Molar flow (kmol/h) | 4,380 | 76,587 | 104,458 | 31,750 | 73,120 | 104,660 | 95,481 | 4,718 | 67,610 |
| Temp (° C.) | 38 | 15 | 25 | 528 | 536 | 655 | 25 | 528 | 7 |
| Pressure (Bara) | 30 | 1 | 1 | 30 | 30 | 1 | 2 | 1 | 14 |
| Component Vol % | | | | | | | | | |
| Oxygen | 0 | 20.7 | 15.1 | 15.0 | 15.1 | 6.4 | 7.1 | 2.4 | 10.2 |
| Nitrogen | 1.6 | 77.3 | 60.6 | 60.3 | 60.6 | 60.5 | 66.3 | 4.9 | 87.6 |
| Carbon dioxide | 1.0 | 0 | 21.8 | 22.2 | 21.8 | 22.2 | 24.3 | 92.7 | 0.7 |
| Methane | 93.1 | 0 | 0 | 0 | 0 | 0 | 0 | 0 | 0 |
| Water | 0 | 1.0 | 1.8 | 1.8 | 1.8 | 10.2 | 1.5 | 0 | 0.5 |
| Argon | 0 | 1.0 | 0.7 | 0.7 | 0.7 | 0.7 | 0.8 | 0 | 1.0 |
| Ethane | 3.2 | 0 | 0 | 0 | 0 | 0 | 0 | 0 | 0 |
| Propane | 0.7 | 0 | 0 | 0 | 0 | 0 | 0 | 0 | 0 |
| n-butane | 0.4 | 0 | 0 | 0 | 0 | 0 | 0 | 0 | 0 |

TABLE 2-continued

| Gas | Permeance (gpu)* | $CO_2$/Gas Selectivity |
|---|---|---|
| Hydrogen | 100 | 10 |
| Water | 5,000** | — |

*Gas permeation unit; 1 gpu = 1 × $10^{-6}$ $cm^3$(STP)/$cm^2$ · s · cmHg
**Estimated, not measured As can be seen, the process produces a membrane residue stream, 129, vented to the stack that contains only 0.65 vol % carbon dioxide. The carbon dioxide product stream, 113, has a carbon dioxide concentration of 93 vol %, and could be compressed and sequestered. Because of the carbon dioxide recycle by the sweep-based membrane separation unit, only 40% removal of the carbon dioxide in stream 108 by the molten salt membranes is required. The process uses a membrane area of about 9,000 $m^2$ for the molten salt membranes and 420,000 $m^2$ for the sweep-based unit.

Example 3

Molten Salt Membranes Used for Gas Separation Step, Permeate Pressure at 2 Bara The calculation of Example 2 was repeated, except this time it was assumed that the permeate side of the molten salt membranes was maintained at 2 bara. The results of the calculations are shown in Table 4.

TABLE 4

| | Stream/number | | | | | | | | |
|---|---|---|---|---|---|---|---|---|---|
| | Fuel 116 | Sweep gas 128 | Compressor feed 106 | Feed to capture step 108 | Feed to combustion step 115 | Turbine exhaust 119 | Membrane feed 125 | CO2 permeate 113 | Membrane residue 129 |
| Molar flow (kmol/h) | 4,380 | 76,587 | 104,600 | 32,027 | 73,220 | 104,822 | 95,624 | 4,932 | 67,610 |
| Temp (° C.) | 38 | 15 | 25 | 523 | 536 | 655 | 25 | 523 | 7 |
| Pressure (Bara) | 30 | 1 | 1 | 30 | 30 | 1 | 2 | 2 | 1 |
| Component Vol % | | | | | | | | | |
| Oxygen | 0 | 20.7 | 15.0 | 15.0 | 15.1 | 6.4 | 7.1 | 3.0 | 10.2 |
| Nitrogen | 1.6 | 77.3 | 60.6 | 60.3 | 60.6 | 60.5 | 66.3 | 6.2 | 87.6 |
| Carbon dioxide | 1.0 | 0 | 22.0 | 22.2 | 21.8 | 22.2 | 24.3 | 91.0 | 0.7 |
| Methane | 93.1 | 0 | 0 | 0 | 0 | 0 | 0 | 0 | 0 |
| Water | 0 | 1.0 | 1.8 | 1.8 | 1.8 | 10.2 | 1.5 | 0 | 0.5 |
| Argon | 0 | 1.0 | 0.7 | 0.7 | 0.7 | 0.7 | 0.8 | 0 | 1.0 |
| Ethane | 3.2 | 0 | 0 | 0 | 0 | 0 | 0 | 0 | 0 |
| Propane | 0.7 | 0 | 0 | 0 | 0 | 0 | 0 | 0 | 0 |
| n-butane | 0.4 | 0 | 0 | 0 | 0 | 0 | 0 | 0 | 0 |

In this case, the concentration of the carbon dioxide product stream, 113, is 91 vol %, slightly lower than in the previous example. However, the stream is withdrawn at 2 bara pressure, thereby reducing the downstream energy requirements for purification or sequestration. The membrane area of molten salt membranes needed is increased to about 12,500 m². The stack gas still contains less than 1 vol % carbon dioxide.

Example 4

Polymeric Membranes Used for Gas Separation Step

A calculation was performed to model the performance of the process of the invention using polymeric membranes for the carbon dioxide capture step. The membranes were assumed to have similar properties to those used for the sweep-driven step 126.

To cool the compressed gas stream 108 to a temperature suitable for operating the membranes, the process was assumed to be carried out in accordance with the design shown in FIG. 3. That is, the feed gas to step 112 was assumed to be cooled by heat exchange against residue stream 114 and incoming steam boiler water, resulting in a gas temperature of 50° C. for the feed stream 111 entering the gas separation membrane unit. Other assumptions were as in Example 2, except that the permeate side of the membranes 133 was assumed to be maintained at 2 bara. The results of the calculations are shown in Table 5.

TABLE 5

| | Stream/number | | | | | | | | | |
|---|---|---|---|---|---|---|---|---|---|---|
| | Fuel 116 | Sweep gas 128 | Compressor feed 106 | Feed to cooling step 108 | Cooled stream 111 | Residue stream 114 | Feed to combustion step 115 | Turbine exhaust 119 | Membrane feed 125 | CO2 permeate 113 | Membrane residue 129 |
| Molar flow (kmol/h) | 4,380 | 76,240 | 104,024 | 32,840 | 32,424 | 26,500 | 72,817 | 103,824 | 95,056 | 5,923 | 67,277 |
| Temp (° C.) | 38 | 15 | 25 | 508 | 50 | 47 | 536 | 638 | 25 | 49 | 15 |
| Pressure (Bara) | 30 | 1 | 1 | 30 | 30 | 30 | 30 | 1 | 2 | 1 | 1 |
| Component Vol % | | | | | | | | | | | |
| Oxygen | 0 | 20.7 | 15.1 | 15.0 | 15.2 | 17.4 | 15.1 | 6.4 | 7.1 | 5.1 | 10.1 |
| Nitrogen | 1.6 | 77.3 | 60.6 | 59.1 | 60.0 | 71.0 | 60.6 | 60.7 | 66.3 | 10.4 | 87.6 |
| Carbon dioxide | 1.0 | 0 | 21.8 | 23.0 | 23.7 | 10.2 | 21.8 | 22.3 | 24.3 | 84.4 | 0.7 |
| Methane | 93.1 | 0 | 0 | 0 | 0 | 0 | 0 | 0 | 0 | 0 | 0 |

TABLE 5-continued

| | Fuel 116 | Sweep gas 128 | Compressor feed 106 | Feed to cooling step 108 | Cooled stream 111 | Residue stream 114 | Feed to combustion step 115 | Turbine exhaust 119 | Membrane feed 125 | CO2 permeate 113 | Membrane residue 129 |
|---|---|---|---|---|---|---|---|---|---|---|---|
| Water | 0 | 1.0 | 1.8 | 1.7 | 0.4 | 0.5 | 1.8 | 9.9 | 1.5 | 0 | 0.5 |
| Argon | 0 | 1.0 | 0.7 | 0.7 | 0.7 | 0.8 | 0.7 | 0.7 | 0.8 | 0 | 1.0 |
| Ethane | 3.2 | 0 | 0 | 0 | 0 | 0 | 0 | 0 | 0 | 0 | 0 |
| Propane | 0.7 | 0 | 0 | 0 | 0 | 0 | 0 | 0 | 0 | 0 | 0 |
| n-butane | 0.4 | 0 | 0 | 0 | 0 | 0 | 0 | 0 | 0 | 0 | 0 |

In this case, the process yielded a carbon dioxide product stream, 113, containing about 85 vol % carbon dioxide. Such a stream could be compressed and sequestered by injection, for example, or sent for further treatment h, cryogenic condensation to produce a high-pressure fluid. The membrane area required for the carbon dioxide capture step using the polymeric membranes is about 2,500 m$^2$.

Example 5

Molten Salt Membranes Used for Gas Separation Step, Two Compressor Loops

A calculation was performed to model the performance of the process of invention in accordance with the design shown in FIG. 5, in which the sweep/permeate gas from membrane unit 126 is directed to compressor 101a and a portion of the turbine exhaust is directed to compressor 101b. The ratio of turbine exhaust gas directed to the sweep unit to gas directed to compression step 101b was set at 3:1. Each compressor was assumed to deliver a compressed gas at 30 bara.

Molten salt membranes were assumed to be used for step 112, and to have similar properties to those of Example 2. The permeate side of the membranes was assumed to be at 2 bara. Other assumptions were as in Example 2. The results of the calculation are shown in Table 6.

The process produces a stack gas containing 0.8 vol % carbon dioxide, and a concentrated product stream containing about 90 vol % carbon dioxide. The process requires a membrane area of about 15,000 m$^2$ for the molten salt membranes, which removes 82% of the carbon dioxide in gas stream 144, but only about 290,000 m$^2$ for the sweep-based unit, compared with 420,000 m$^2$ for the examples based on the FIG. 1 design.

We claim:

1. A gas separation and power generation process, comprising the following steps:
   (a) compressing an oxygen-containing stream in a compression apparatus, thereby producing compressed gas stream;
   (b) combusting a first portion of the compressed gas stream with a gaseous fuel in a combustion apparatus, thereby producing a combusted gas stream;
   (c) separating a second portion of the compressed gas stream in a gas separation apparatus adapted to selectively remove carbon dioxide, thereby producing a carbon-dioxide enriched stream and a carbon-dioxide-depleted stream;
   (d) routing the carbon-dioxide-depleted stream and the combusted gas stream as first and second working gas streams to a gas turbine apparatus mechanically coupled to an electricity generator, and operating the gas turbine

TABLE 6

| | Fuel 116 | Sweep gas 128 | Compressor feed 106 | Feed to combressor 101b 145 | Feed to CO2 removal 144 | Turbine exhaust 119 | Membrane feed 125 | CO2 permeate 113 | Membrane residue 129 |
|---|---|---|---|---|---|---|---|---|---|
| Molar flow (kmol/h) | 4,380 | 61,338 | 81,274 | 24,131 | 24,901 | 105,639 | 72,393 | 5,043 | 52,457 |
| Temp (° C.) | 38 | 15 | 25 | 25 | 375 | 634 | 25 | 374 | 11 |
| Pressure (Bara) | 30 | 1 | 1 | 2 | 30 | 1 | 2 | 2 | 1 |
| Component Vol % | | | | | | | | | |
| Oxygen | 0 | 20.7 | 15 | 4.5 | 4.5 | 4.2 | 4.5 | 1.1 | 7.2 |
| Nitrogen | 1.6 | 77.3 | 62.1 | 69.6 | 68.8 | 63.6 | 70.0 | 8.6 | 90.3 |
| Carbon dioxide | 1.0 | 0 | 20.4 | 23.5 | 24.3 | 21.4 | 23.5 | 90.3 | 0.8 |
| Methane | 93.1 | 0 | 0 | 0 | 0 | 0 | 0 | 0 | 0 |
| Water | 0 | 1.0 | 1.8 | 1.5 | 1.5 | 10.0 | 1.5 | 0 | 0.5 |
| Argon | 0 | 1.0 | 0.7 | 0.8 | 0.8 | 0.8 | 0.8 | 0 | 1.1 |
| Ethane | 3.2 | 0 | 0 | 0 | 0 | 0 | 0 | 0 | 0 |
| Propane | 0.7 | 0 | 0 | 0 | 0 | 0 | 0 | 0 | 0 |
| n-butane | 0.4 | 0 | 0 | 0 | 0 | 0 | 0 | 0 | 0 | apparatus, thereby generating electric power and producing a turbine exhaust stream;
(e) passing at least a first portion of the turbine exhaust stream to a membrane separation step, wherein the membrane separation step comprises:
  (i) providing a membrane having a feed side and a permeate side, and being selectively permeable to carbon dioxide over nitrogen and to carbon dioxide over oxygen,
  (ii) passing the first portion of the turbine exhaust stream across the feed side,
  (iii) passing air, oxygen-enriched air, or oxygen as a sweep stream across the permeate side,
  (iv) withdrawing from the feed side a residue stream that is depleted in carbon dioxide compared to the turbine exhaust stream,
  (v) withdrawing from the permeate side a permeate stream comprising oxygen and carbon dioxide; and
(f) passing the permeate stream to step (a) as at least a portion of the oxygen-containing stream.

2. The process of claim 1, wherein the gas separation apparatus is a membrane separation apparatus.

3. The process of claim 1, wherein the gas separation apparatus is an absorption apparatus.

4. The process of claim 2, wherein the membrane separation apparatus incorporates molten salt membranes.

5. The process of claim 2, wherein the membrane separation apparatus incorporates polymeric membranes.

6. The process of claim 2, wherein the membranes separation apparatus incorporates ceramic membranes.

7. The process of claim 3, wherein the absorption apparatus uses an amine-based sorbent.

8. The process of claim 3, wherein the absorption apparatus uses a carbonate-based sorbent.

9. The process of claim 1, further comprising cooling the second portion of the compressed gas stream before routing it to the gas separation apparatus.

10. The process of claim 1, further comprising cooling the turbine exhaust stream before passing it to the membrane separation step.

11. The process of claim 1, further comprising routing a third portion of the compressed gas stream as a third working gas stream to the gas turbine apparatus of step (d).

12. The process of claim 1, wherein the gaseous fuel comprises natural gas.

13. The process of claim 1, wherein the gaseous fuel comprises syngas.

14. The process of claim 1, further comprising routing the turbine exhaust stream to a heat recovery steam generator before carrying out step (e).

15. The process of claim 1, wherein the residue stream has a carbon dioxide concentration of less than 1 vol %.

16. The process of claim 1, wherein the carbon-dioxide-enriched stream has a carbon dioxide concentration of at least 90 vol %.

17. The process of claim 1, wherein the carbon-dioxide-depleted stream contains at least 5 vol % carbon dioxide.

18. The process of claim 1, wherein a second portion of the turbine exhaust stream is withdrawn upstream of the membrane separation step and recirculated to step (a) for recompression in the compression apparatus.

19. The process of claim 1, wherein:
(A) step (a) is carried out such that the compression apparatus comprises a first compressor and a second compressor, the first compressor producing a first compressed gas stream and the second compressor producing a second compressed gas stream;
(B) step (f) is carried out by passing the permeate stream to the first compressor;
(C) the first compressed gas stream is combusted as the first portion in step (b);
(D) a second portion of the turbine exhaust stream is withdrawn upstream of the membrane separation step and directed to step (a) for compression in the second compressor;
(E) the second compressed gas stream is separated as the second portion in step (c).

20. A gas separation and power generation process, comprising the following steps:
(a) compressing an oxygen-containing stream in a first compression apparatus, thereby producing a first compressed gas stream;
(b) compressing a carbon-dioxide-containing gas stream in a second compression apparatus, thereby producing a second compressed gas stream;
(c) combusting the first compressed gas stream in a combustion apparatus, thereby producing a combusted gas stream;
(d) separating the second compressed gas stream in a gas separation apparatus adapted to selectively remove carbon dioxide, thereby producing a carbon-dioxide enriched stream and a carbon-dioxide-depleted stream;
(e) routing the carbon-dioxide-depleted stream and the combusted gas stream as first and second working gas streams to a gas turbine apparatus mechanically coupled to an electricity generator, and operating the gas turbine apparatus, thereby generating electric power and producing a turbine exhaust stream;
(f) passing at least a first portion of the turbine exhaust stream to a membrane separation step, wherein the membrane separation step comprises:
  (i) providing a membrane having a feed side and a permeate side, and being selectively permeable to carbon dioxide over nitrogen and to carbon dioxide over oxygen,
  (ii) passing the first portion of the turbine exhaust stream across the feed side,
  (iii) passing air, oxygen-enriched air, or oxygen as a sweep stream across the permeate side,
  (iv) withdrawing from the feed side a residue stream that is depleted in carbon dioxide compared to the turbine exhaust stream,
  (v) withdrawing from the permeate side a permeate stream comprising oxygen and carbon dioxide;
(g) passing the permeate stream to step (a) as at least a portion of the oxygen-containing gas; and
(h) passing a second portion of the turbine exhaust gas to step (b) as at least a portion of the carbon-dioxide-containing gas.

21. The process of claim 20, further comprising routing the turbine exhaust stream to a heat recovery steam generator before carrying out steps (f) and (h).

22. The process of claim 20, wherein the gas separation apparatus comprises a membrane separation apparatus.

23. The process of claim 20, wherein the gas separation apparatus comprises an absorption unit.

24. The process of claim 20, wherein the residue stream has a carbon dioxide concentration of less than about 1 vol %.

25. The process of claim 20, wherein the carbon-dioxide-enriched stream has a carbon dioxide concentration of at least about 90 vol %.

* * * * *